United States Patent [19]

McLean

[11] 4,286,791
[45] Sep. 1, 1981

[54] PACKING ASSEMBLY FOR A MOVABLE SHAFT

[75] Inventor: Douglas K. McLean, Dallas, Tex.

[73] Assignee: Double-E Inc., Dallas, Tex.

[21] Appl. No.: 111,802

[22] Filed: Jan. 14, 1980

[51] Int. Cl.³ .................. F16J 15/06; F16J 15/18
[52] U.S. Cl. ............................. 277/64; 277/102; 277/110
[58] Field of Search .................. 277/64, 102, 110

[56] References Cited

U.S. PATENT DOCUMENTS

| 2,110,098 | 3/1938 | Strecker | 277/64 |
| 2,322,679 | 6/1943 | Williamson | 277/64 |
| 3,831,676 | 8/1974 | Brown | 277/64 |

Primary Examiner—Robert I. Smith
Attorney, Agent, or Firm—Peter J. Murphy; H. Mathews Garland

[57] ABSTRACT

A gland body is coupled at its proximal end to a supporting housing by means of a union. A first packing chamber, for a static shutdown packing, is formed at the proximal end of the gland body, with a wedge ring forming the base of the chamber. The wedge ring has a beveled surface diverging outwardly from the base; and a packing body has a complementary beveled surface confronting the wedge ring. A mandrel having a reduced diameter proximal end is received within the gland body for urging the first packing toward the wedge ring. A second packing chamber is formed at the distal end of the gland body confronting the mandrel; and a packing cap threaded onto the distal end of the body compresses the second packing body to seal the mandrel and gland body. The distal end of the mandrel is enlarged to form a third packing chamber confronting the shaft for receiving a third packing body being a dynamic packing for the reciprocating shaft. A gland cap threaded onto the distal end of the mandrel compresses the third packing body.

21 Claims, 4 Drawing Figures

PACKING ASSEMBLY FOR A MOVABLE SHAFT

This invention relates to a packing gland assembly for a movable shaft, including a shutdown packing gland.

The packing gland assembly of this invention is designed particularly for use with a wellhead flow control device for a producing oil well, where oil is produced from a formation of asphaltic crude which includes highly toxic gases such as hydrogen sulphide, and where the polished rod of a sucker rod string passes through the flow control device.

Since the release to the atmosphere of a very small amount of such toxic gases may be very dangerous, it is important that the packing gland assembly for such wellhead flow control device provide an effective dynamic packing to seal the reciprocating polished rod, and also an effective static packing for sealing the idled polished rod in the event of leakage at the dynamic packing, and to enable repair or replacement of the dynamic packing.

An object of this invention is to provide a novel packing assembly for a movable shaft, including a dynamic shaft packing and a static shutdown packing.

Another object of this invention is to provide such a packing assembly wherein the dynamic packing may be repaired readily while the shutdown packing is effective to seal the shaft.

A further object of this invention is to provide such novel packing assembly including external operator means for the shutdown packing.

Still another object of this invention is to provide such novel packing assembly which is readily removable from the support housing, and wherein the several packing glands of the assembly are readily disassembled for repair, with the polished rod in place.

A still further object of this invention is to provide such packing assembly including a shutdown packing gland wherein the packing components are removable from either end of the gland body.

Another object of this invention is to provide such packing assembly wherein the packing material for the shutdown packing gland is fabricated as an integrated packing body.

A further object of this invention is to provide such packing assembly wherein the shutdown packing is adapted to be closed by external power means.

These objects are accomplished in a packing assembly for a movable shaft which projects from a housing to be sealed. The assembly includes a gland body having threaded means at its proximal end for sealing attachment to the housing, and providing a first packing chamber confronting the shaft adjacent the proximal end. A first annular packing body is disposed in the first packing chamber. An elongated tubular mandrel surrounds the shaft with its proximal end disposed within the gland body for compressing the first packing body within its packing chamber. The gland body provides a second packing chamber confronting the mandrel adjacent to its proximal end; and a second annular packing body is disposed in the second packing chamber. A packing cap threadedly mounted on the distal end of the gland body effects the compressing of the second packing body within its respective chamber. The mandrel provides a third packing chamber adjacent to its distal end, confronting the shaft. A third annular packing body is disposed in the third packing chamber; and a packing cap threadedly mounted on the distal end of the mandrel effects compression of the third packing body within its chamber. A coupling means is provided between the gland body and the mandrel for effecting axial compression of the mandrel relative to the body for compressing the first packing body.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 1A:
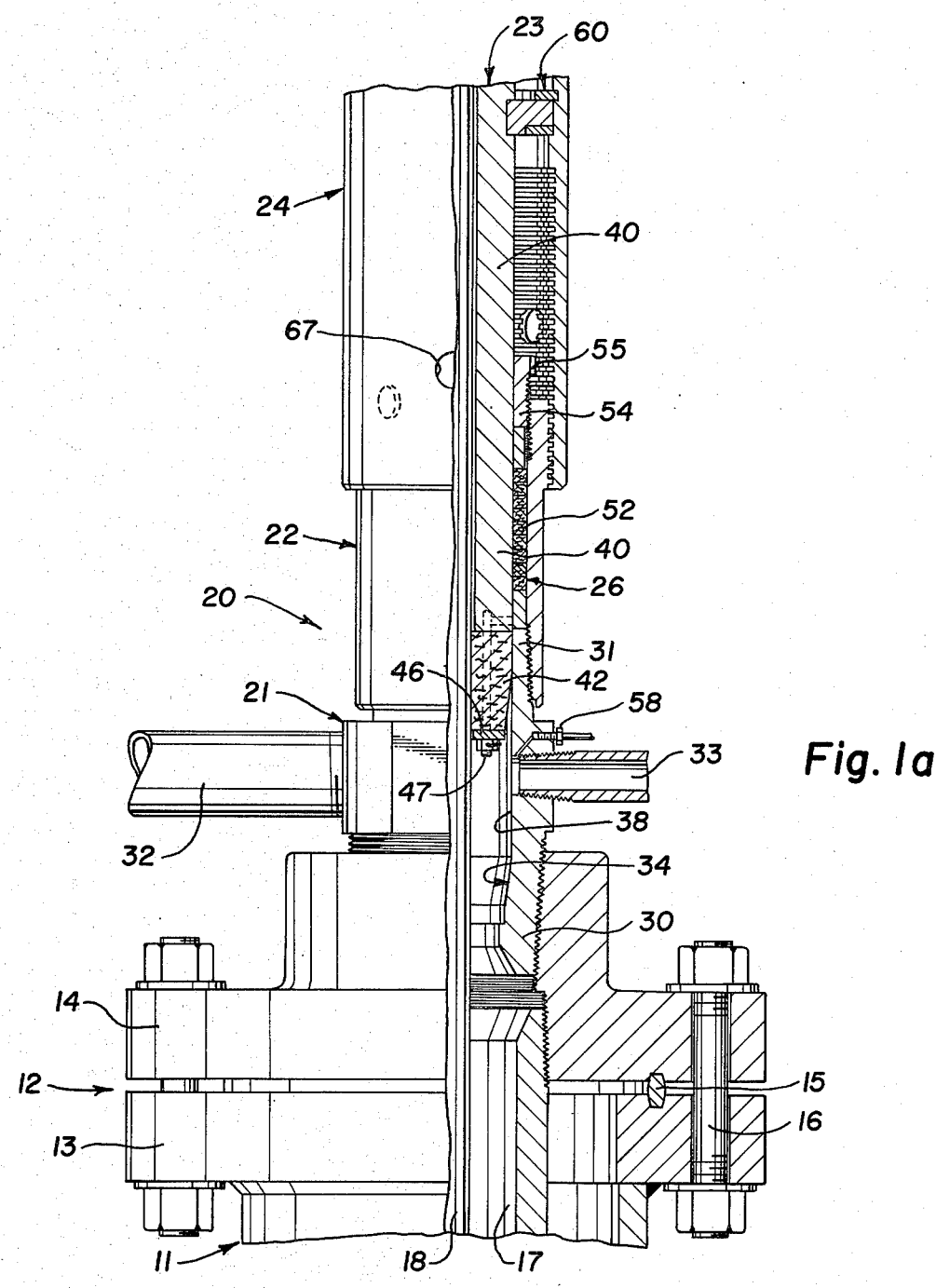
FIG. 1a is a view of the lower portion of a flow control device, partially in elevation and partially in axial section.

In the drawings packing gland assemblies, according to the invention are illustrated as subassemblies for a wellhead flow control device in association with the polished rod of a well pump. Referring to FIG. 1a, a wellhead flow control device 20 is mounted on a wellhead 11 by a coupling assembly 12 which consists of a lower flange 13, an upper flange 14 and a coacting ring seal 15. The wellhead 11 may consist, for example, of a casing, a production casing bowl, well tubing, or other member; and the lower flange is attached thereto by means of welding, for example. The flanges clamp the ring seal by means of peripherally spaced nut-bolt assemblies 16. The upper flange is threaded internally for suspending a string of well tubing 17. The flow control device is designed for use with the polished rod 18 of a well pump.

The principal components of the flow control device are a valve body consisting of a lower valve body 21 and an upper valve body 22, a vertically reciprocible closure assembly in the form of a ram 23, an operator sleeve 24 for coupling and reciprocating the closure ram relative to the valve body, and a polished rod packing assembly 25 at the upper end of the ram for providing a gas tight seal between the ram 23 and the polished rod 18. The valve body, particularly the upper valve body 22, includes a ram packing gland 26 for providing a gas tight seal between the ram and the valve body. The lower valve body defines a valve seat for the packing plug assembly associated with the closure ram.

The lower valve body 21 includes a lower externally threaded nipple 30 for engagement with the upper flange 14 of the coupling assembly, and an upper externally threaded nipple 31 for threaded engagement with the upper valve body, the nipples being axially aligned and the body providing an axial chamber for receiving the ram 23 and also for the passage of the polished rod. This lower valve body is provided with transverse internally threaded ports for the attachment of pipes defining a flow line 32 and a sampling line 33. The body chamber defines an upward facing annular valve seat 34. The pipes for the flow line and sampling line open to the upper cylindrical chamber 38 above the valve seat 34.

The closure ram 23 consists of a generally cylindrical body 40, having an axial bore dimensioned for free sliding reciprocation of the polished rod 18. The body has an upper, externally threaded nipple 41 for attachment of the rod packing assembly 25. The ram body has a principal outer diameter dimensioned for a free sliding fit with the cylindrical chamber portion 38 of the lower valve body. An annular packing plug 42 is secured to the lower end of the ram body. The packing plug is retained on the ram body by an axially split annular retaining ring 46, retained to the body by tie rods 47.

The upper valve body 22 is a generally cylindrical sleeve having internal threads at its lower end for joining it to the lower valve body 21, and having internal and external threads at its upper end. The principal internal diameter of the sleeve 22 is larger than that of the body chamber 38 and of the ram body 40 to accommodate the ram packing gland 26 operative between the valve body and the ram body. This ram packing gland includes an annular packing material 52, and an externally threaded packing nut 54 threaded into the upper end of the sleeve 22. The exposed upper end of the packing nut is provided, at its outer periphery, with a plurality of peripherally spaced indentions 55 to enable the rotation of the packing nut without disassembly of the flow control device.

The operator sleeve 24 is a generally cylindrical member having internal square threads throughout most of its length for coaction with the external square threads on the upper end of the upper valve body 22. The operator sleeve is coupled to the ram body by means of a thrust coupling 60, which transfers axial thrust forces from the operator sleeve to the ram body. Rotation of the operator sleeve is effected by an operator handle 65, in the form of an elongated bar extending through transversely aligned holes in the operator sleeve.

To enable tightening of the packing nut 54, of the ram packing gland, the operator sleeve is provided with several axially and rotationally spaced access holes 67. These access holes are disposed generally in the area of the exposed portion of the packing nut 54, when the valve is open, to enable rotation of the packing nut by engaging the indentions 55 with a suitable tool through an access hole.

A safety vent passage is provided in the lower valve body 21 above the valve seat. This consists of a vent passage including an internally threaded bore opening to the exterior wall for receiving a rupture disk and vent fitting 58 for connecting a vent conduit to the valve housing.

The flow control device 25, which has been described briefly herein, is the subject of a separate co-pending patent application of the inventor.

Figure 1B:
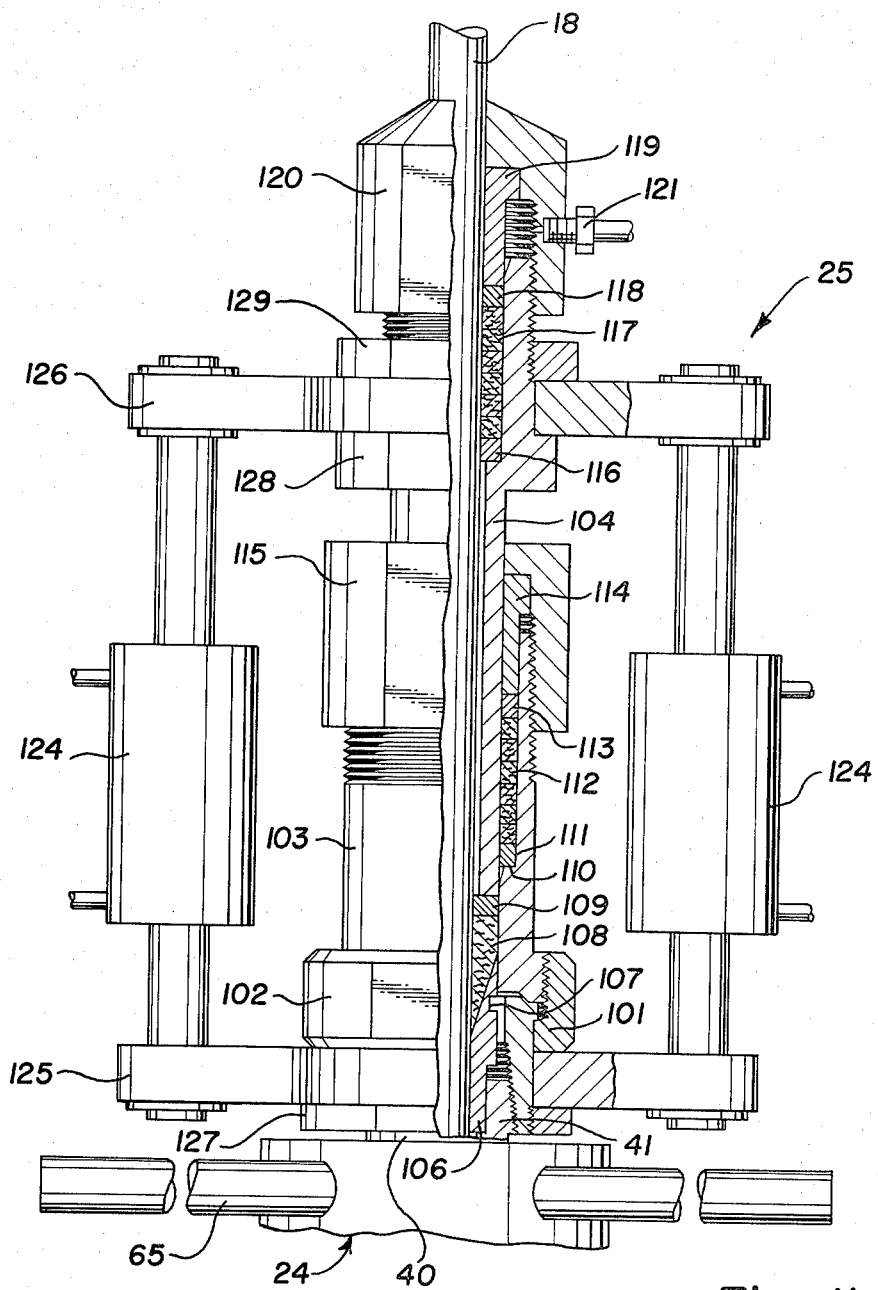
FIG. 1b is a view of the upper portion of the flow control device of FIG. 1a, partially in elevation and partially in section, including a packing assembly according to the invention.
Figure 2:
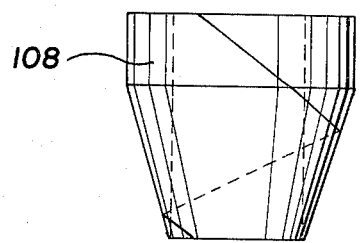
FIG. 2 is a detail view of a shutdown packing body for the packing assembly of FIG. 1b.

FIGS. 1b and 2 of the drawing illustrate one preferred form of rod packing assembly 25 according to the invention, which includes a packing leak safety shutdown system. FIG. 1b illustrates portions of the flow control device 20 including the operator sleeve 24 and associated operator handle 65, and the nipple 41 at the upper end of the ram body 40. The packing assembly 25 is secured to the nipple 41 of the ram by means of a union consisting of a union body 101 threaded onto the ram nipple, a union ring 102 and the externally threaded lower flange of a packing gland body 103. A mandrel 104 is a generally tubular member having a lower or proximal reduced diameter portion dimensioned to be received within the gland body, and having an enlarged upper or distal portion defining a gland body for the rod packing gland.

The packing assembly 25 includes three packing glands, a static shutdown packing gland, a static mandrel packing gland, and a dynamic rod packing gland.

The mandrel is the operator for the shutdown packing gland which consists of the following components. A rod guide bushing 106 is an axially split sleeve having its proximal end confined within a recess in the ram nipple 41. This bushing is fabricated from a suitable bearing metal, and functions in part to guide and center the polished rod 18 relative to the ram 40 and to the packing assembly 25. The distal end of this bushing is provided with an internal, inwardly converging conoid surface defining a packing wedge; and this distal end is received within the lower end of the gland body 103. The bushing 106 is provided with notches 107 to enable prying of the bushing segments from the nipple 41. A packing body 108 is confined between the packing wedge and an upper split packing ring 109, which define the packing chamber. The packing ring is engaged by the proximal end of the mandrel 104.

The packing body 108 may be fabricated from any suitable material such as metallic wool, metallic felt or metallic tape, and/or ceramic fibers, which will act as a bulk sealing material under the extant conditions and which is chemically inert with respect to hydrogen sulfide or other corrosive gases. This packing body is preferably formed into a unitary body of defined shape. FIG. 2 is a detail view of this packing body 108, illustrating the shape which includes an upper cylindrical portion and a lower external conoid which coacts with the conoid surface of the packing wedge. In preferred form the packing body may be fabricated in the form of a one piece spiral, as illustrated in FIG. 2, so that it may be assembled around the polished rod 18. In assembled relation, as seen in FIG. 1b, the packing body will not be maintained in engagement with the rod, but is a standby shutdown packing to be employed, for example, in the event of a leak in the rod packing to be described. In this event the mandrel 104 will be moved downward to effect radially inward compression of the packer body by coaction with the conoid of the packing wedge. This seating of the body will occur only after reciprocation of the polished rod is stopped.

The mandrel packing gland includes a packing chamber 110 disposed in the distal end of the gland body 103, a split lower packing ring 111, gland packing material 112, a split upper packing ring 113, a split pusher sleeve 114 and a packing cap 115 threadedly coupled to the gland body 103. The packing rings and pusher sleeve are preferably formed as diametral halves to enable assembly around the polished rod 18. The packing material 112 may be a wrap-around packing or other suitable gland packing material.

The rod packing gland consists of the gland body and packing chamber defined by the distal end of the mandrel 104, a lower metallic, split packing ring 116, gland packing material 117, an upper metallic split packing ring 118, and a split guide bushing 119 functioning as a pusher sleeve retained within the upper gland cap 120. Again, the packing rings and pusher sleeve are preferably formed as diametral halves to enable assembly around the polished rod 18. The gland cap 120 is threadedly coupled to the upper end of the mandrel 104. This rod packing gland is subject to considerable wear because of reciprocation of the rod; and the packing material and packing rings should be chosen for wear resistance as well as for sealing against the leakage of toxic gases. Suitable material for this packing gland may be a strand of the above described material identified as metallic materials. The guide bushing 119 functions as a centering bushing for centering the rod relative to the packing assembly at the upper end, and is preferably fabricated from a suitable bearing material resistant to corrosive gases and fumes.

The gland cap 120 is provided with a suitable vent passage and sniffer fitting 121 for connecting the upper end of the rod packing to a suitable gas detector for the purpose of warning and/or for automatic control of the safety shutdown mechanism.

The safety shutdown mechanism consists of a pair of oppositely disposed, double acting, hydraulic cylinders 124, connected between lower and upper yokes 125 and 126 mounted respectively on the union body 101 and the mandrel 104. The lower yoke 125 is seated against the lower face of the union ring 102 by a nut 127. The upper yoke 126 is seated against the upper face of a flange 128 of the mandrel by a nut 129. It will be seen then that the double acting hydraulic cylinders 124 function as part of the safety shutdown system. An automatic control may respond to detection of a leak at the sniffer fitting 121 and effect automatic operation of the cylinders to move the upper yoke 126 downward and effect compression of the packing body 108 against the polished rod 18. Such automatic control would effect simultaneous shutdown of the pump and accompanying reciprocation of the polished rod. This enables safety shutdown of the system and prevents any leakage of gas until the rod packing gland can be suitably adjusted or repaired.

Figure 3:
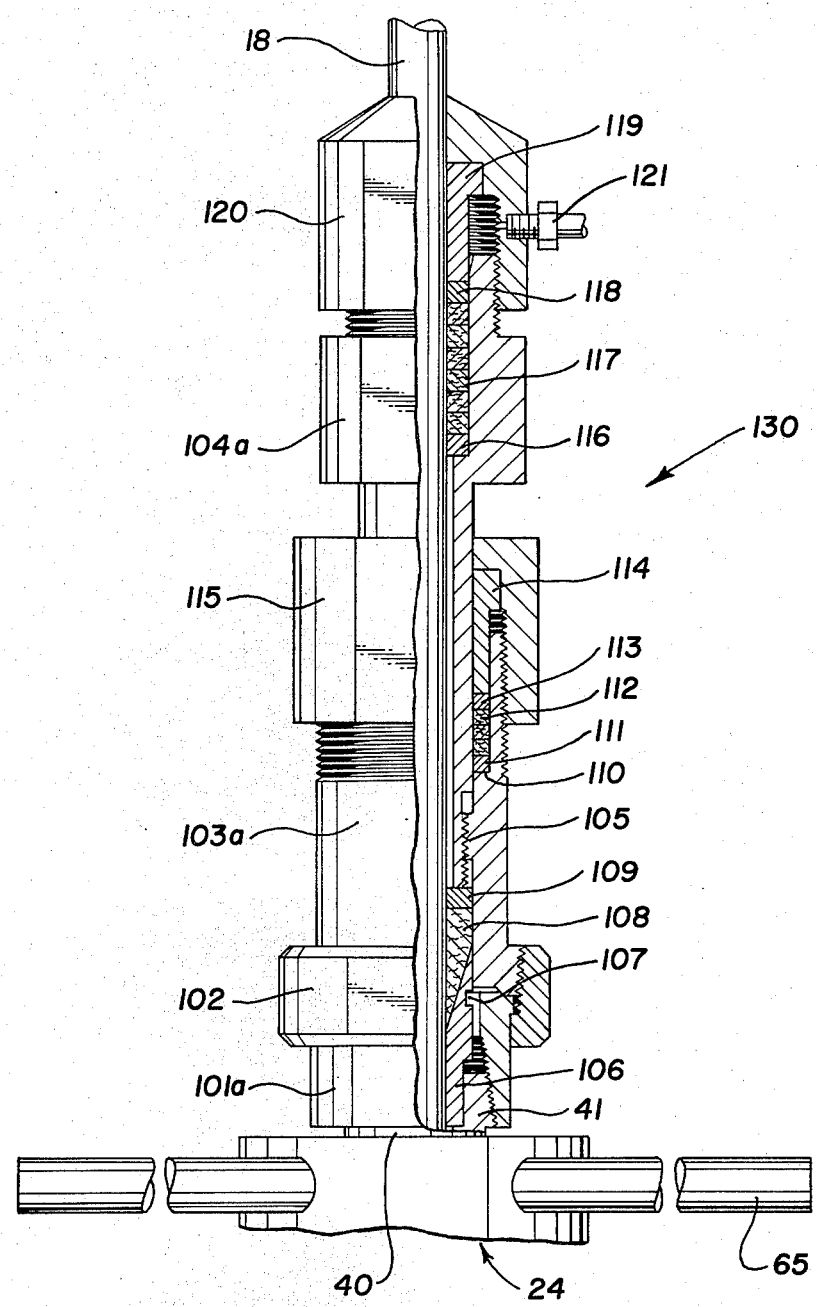
FIG. 3 is a view, similar to that of FIG. 1b, illustrating an alternative form of packing assembly according to the invention.

FIG. 3 illustrates a modified form of rod packing assembly according to the invention, wherein the rod shutdown packing gland is operated manually rather than by hydraulic power means. This assembly is shown mounted on the same ram body 40 and ram nipple 41; and the components of the assembly which are identical to those described above are identified by the same reference numbers, and the components which are modified but equivalent to those described above are identified by the same reference numbers with the subscript a. This assembly is secured to the nipple 41 by means of a union consisting of a union body 101a threaded onto the ram nipple, a union ring 102, and the externally threaded lower flange of a packing gland body 103a. The gland body is provided with a short length of internal threads 105 intermediate its ends. The mandrel 104a is a generally tubular member having a lower or proximal reduced diameter portion dimensioned to be received within the gland body, and having an enlarged upper or distal portion defining a gland body for the rod packing gland. The proximal end of the mandrel is provided with external threads for coaction with the threads 105 of the first named gland body. The packing assembly 130 also includes three packing glands: a static shutdown packing gland, a static mandrel packing gland, and a dynamic rod packing gland.

The mandrel 104a is the operator for the shutdown packing gland which consists of the components previously described including the wedge ring 106 and the packing body 108. Again, this shutdown packing is engaged by the proximal end of the mandrel 104a, through the upper packing ring 109, and the packing body 108 is compressed through rotation of the mandrel 104a and the operation of the threads 105. The packing body 108 has the same configuration and construction as that previously described, and functions in the same manner.

The mandrel packing gland, disposed in the packing chamber 110 at the distal end of the gland body 103a, also includes the same components including the packing body 112. Similarly, the rod packing gland consists of the same components including the packing body 117 and the guide bushing 119, and functions in the same manner. The gland cap 120 is provided with a suitable vent passage and sniffer fitting 121 for connecting the upper end of the rod packing to a suitable gas detector; and for this embodiment the gas detector will trigger a suitable warning device such as an audible or visble signal device or both; and this will alert the operator personnel to close the shutdown gland by rotating the mandrel 104a.

OPERATION

The operation of the above described packing assemblies from the standpoint of the packing functions, is believed to be apparent from the foregoing description; and the following is a discussion of maintenance and repair operation.

In order to disassemble the packing assembly 25 from the ram body 40, it is first necessary to disconnect the power cylinders 124 from either or both of the yokes 125 and 126. The nut 127 is then loosened to release the yoke 125 from the union body 101; and the union ring 102 may then be loosened to release the gland body 103 along the remainder of the assembly to be slipped upward on the polished rod 18. Preferably the rod packing gland cap 120 would first be loosened to reduce the friction of the packing body 117 on the polished rod.

Should the rod guide bushing 106 require replacement, the union body 101 may be unthreaded from the ram nipple 41, allowing the removal and replacement of the split sleeves of this bushing.

Should the shutdown packing require replacement, the split members of the packing wedge 106 may be removed from the gland body by engaging a prying tool in the notches 107; and the packing body 108 and packing rings 109 may then be pushed from the lower end of the gland body either by the mandrel 104 or by another suitable implement.

With the shutdown packing components removed, removal of the components of the mandrel packing are also readily accomplished after first separating the gland cap 115.

For removing the components of the rod packing, the gland cap 120 is first unthreaded and separated from the mandrel, and the mandrel may then be separated from the gland body 103. After removal of the split guide bushing halves 119, the packing body 117 and packing rings 116 and 118 may be removed by a suitable elongated pushing tool which may be passed through the clearance space between the mandrel and the shaft 18.

The packing assembly is designed so that the dynamic rod packing may be removed and replaced while the shut down packing is effective to seal the rod 18. This involves unthreading of the gland cap 120, removal of the guide bushing halves 119 and removal of the upper packing ring halves 118 and of the packing body 117 from the top of the assembly. While this packing removal and replacement is more difficult, it can be accomplished with safety.

An important feature of this invention is the construction of a packing assembly, for association with a movable rod or shaft such as the polished rod of a well pump, which facilitates the maintenance and/or repair of the several packing glands of the assembly and therefore minimizes unnecessary down time.

Another important feature of the invention is the provision of a packing assembly including a dynamic rod packing gland and a static shutdown packing gland for the rod, wherein the shutdown packing may be operated by external power means in the event of leakage detected at the dynamic gland.

Another feature of the invention is the configuration of the wedge-shaped packing chamber for the packing material of the shutdown packing gland, and of the wedge-shaped configuration of the packing body coacting with that chamber.

Still another important feature of the invention is the provision of the guide bushing 106 consisting of split members seated within ram nipples to center the polished rod relative to both the ram and the attached packing assembly. A related advantage is the provision of the prying notches 107 which coact with the union structure to enable ready separation of the packing assembly from the ram, and the ready removal of a worn guide bushing with a prying took, utilizing the prying notches.

While preferred embodiments of the invention have been illustrated and described, it will be understood by those skilled in the art that changes and modifications may be resorted to without departing from the spirit and scope of the invention.

What is claimed is:

1. In a packing assembly for a movable shaft which projects from a housing to be sealed, said packing assembly comprising
    a gland body having threaded means at its proximal end for sealing attachment to said housing; said body providing a first packing chamber confronting said shaft adjacent to said proximal end, a first annular packing body disposed in said first packing chamber;
    an elongated tubular mandrel surrounding said shaft, having its proximal end disposed within said gland body for compressing said first packing body within said first packing chamber;
    said gland body providing a second packing chamber, confronting said mandrel adjacent to its proximal end; a second annular packing body disposed in said second packing chamber; means including a packing cap threadedly mounted on the distal end of said gland body for compressing said second packing body within its respective chamber;
    said mandrel providing a third packing chamber, adjacent to its distal end, confronting said shaft; a third annular packing body disposed in said third packing chamber; means including a packing cap threadedly mounted on the distal end of said mandrel for compressing said third packing body within its respective chamber;
    and means coupling said gland body and said mandrel for effecting axial movement of said mandrel relative to said body, for compressing said first packing body in its respective packing chamber.

2. A device as set forth in claim 1 characterized by means providing a beveled base wall for said first packing chamber; said base wall converging toward said shaft to define a wedge space.

3. A device as set forth in claim 1 characterized by said coupling means comprising a first yoke means mounted on said gland body, a second yoke means mounted on said mandrel, and a pair of power cylinders connected between said yoke means.

4. A device as set forth in claim 1 characterized by said coupling means comprising a threaded connection between said gland body and said mandrel.

5. A device as set forth in claim 1 characterized by said body being connected to said housing by means of a union.

6. A device as set forth in claim 2 characterized by said first packing chamber being defined by a cylindrical wall extending to the proximal end of said gland body; an annular wedge ring disposed in said first packing chamber at the proximal end of said gland body, providing said base wall of said chamber; said wedge ring having a beveled internal surface converging toward said shaft to define a wedge space.

7. A device as set forth in claim 6 characterized by said wedge ring being received partially within said first packing chamber at the proximal end of said gland body, and having external recess means to enable the prying of said ring from said body.

8. A device as set forth in claim 2 characterized by said first packing body having an external beveled surface confronting axially said beveled chamber base wall.

9. A device as set forth in claim 8 characterized by said first packing body being fabricated as a one-piece spiral member wrapped around said shaft.

10. A device as set forth in claim 2 characterized by said first packing body being a generally cylindrical hollow member, having an external beveled surface at one end confronting said beveled chamber base wall.

11. A device as set forth in claim 1 characterized by said first packing body being fabricated from a fibrous metallic material.

12. A device as set forth in claim 1 characterized by said second packing body being formed from a fibrous metallic material.

13. A device as set forth in claim 1 characterized by said second packing body being formed from stranded, wrap-around packing material.

14. A device as set forth in claim 1 characterized by said third packing body being formed from a fibrous metallic material.

15. A device as set forth in claim 1 characterized by said third packing material being formed from stranded, wrap-around packing material.

16. A device as set forth in claim 1 characterized by a guide bushing confined within said mandrel packing cap, for centering said shaft relative to said gland assembly.

17. A device as set forth in claim 16 characterized by said guide bushing comprising axially split sleeve members fabricated from a bearing material.

18. A device as set forth in claim 16 characterized by said guide bushing functioning as a pusher sleeve between said third packing body and its associated packing cap.

19. A device as set forth in claim 1 characterized by said packing bodies being fabricated from fibrous ceramic material.

20. A device as set forth in claim 5 characterized by split guide bushing means partially confined within said housing and partially confined within said body for centering and guiding the movable shaft relative to said housing and said body; said guide bushing means bridging said union axially;

said guide bushing means having external notch means intermediate the ends thereof for coaction with a prying tool when said union is separated.

21. A device as set forth in claim 20 characterized by the ends of said guide bushing means, confined within said body, providing a beveled base wall for said first packing chamber; said base wall converging toward said shaft to define a wedge space.

* * * * *